(12) United States Patent
Teune

(10) Patent No.: US 11,060,837 B2
(45) Date of Patent: Jul. 13, 2021

(54) METHOD OF CALIBRATING AN APPARATUS FOR POINTING SPATIAL COORDINATES AS WELL AS A CORRESPONDING APPARATUS

(71) Applicant: Prodim International B.V., Helmond (NL)

(72) Inventor: Rene Teune, Helmond (NL)

(73) Assignee: Prodim International B.V., Helmond (NL)

( * ) Notice: Subject to any disclaimer, the term of this patent is extended or adjusted under 35 U.S.C. 154(b) by 19 days.

(21) Appl. No.: 16/577,390

(22) Filed: Sep. 20, 2019

(65) Prior Publication Data

US 2020/0096305 A1 Mar. 26, 2020

(30) Foreign Application Priority Data

Sep. 20, 2018 (NL) ..................................... 2021673

(51) Int. Cl.
*G01B 5/008* (2006.01)
*G01B 21/04* (2006.01)

(52) U.S. Cl.
CPC ............ *G01B 5/008* (2013.01); *G01B 21/042* (2013.01)

(58) Field of Classification Search
CPC .............................. G01B 21/042; G01B 5/008
USPC ............................ 33/502, 1 CC, 503; 73/1.79
See application file for complete search history.

(56) References Cited

U.S. PATENT DOCUMENTS

| | | | | |
|---|---|---|---|---|
| 5,724,264 A | * | 3/1998 | Rosenberg | G01B 5/008 702/152 |
| 6,023,850 A | * | 2/2000 | Trapet | G01B 21/042 33/502 |
| 6,175,647 B1 | | 1/2001 | Schick et al. | |
| 9,212,889 B2 | * | 12/2015 | Teune | G01B 5/004 |
| 2005/0086820 A1 | * | 4/2005 | Stiblert | G03F 7/70516 33/502 |
| 2005/0151963 A1 | * | 7/2005 | Pulla | G01B 21/02 356/139.03 |
| 2009/0187373 A1 | * | 7/2009 | Atwell | B25J 9/1692 702/152 |
| 2010/0198543 A1 | | 8/2010 | Teune | |
| 2015/0159987 A1 | * | 6/2015 | Abe | G01B 5/008 33/503 |
| 2016/0131476 A1 | * | 5/2016 | Haverkamp | G01B 1/00 73/1.79 |

(Continued)

FOREIGN PATENT DOCUMENTS

| | | |
|---|---|---|
| EP | 1226401 A1 | 7/2002 |
| WO | 2016139458 A1 | 9/2016 |

*Primary Examiner* — Christopher W Fulton
(74) *Attorney, Agent, or Firm* — Suiter Swantz pc llo

(57) ABSTRACT

A method of calibrating an apparatus for pointing spatial coordinates, wherein said apparatus comprises a moveable hand-held probe, having a pointing tip for pointing at said spatial coordinates, and a portable base unit, wherein said portable base unit is provided with sensors for measuring, in a predefined three dimensional, 3D, working area surrounding said portable base unit, a relative position of said pointed spatial coordinates with respect to said portable base unit, wherein said method comprises the steps of determining an actual 3D working area for a particular measurement, wherein said actual 3D working area is a sub-area of said predefined 3D working area, calibrating said apparatus in said actual 3D working area.

14 Claims, 2 Drawing Sheets

(56) References Cited

U.S. PATENT DOCUMENTS

2016/0180511 A1\* 6/2016 Zhou ................... B29C 66/304
                                                        348/187

\* cited by examiner

METHOD OF CALIBRATING AN APPARATUS FOR POINTING SPATIAL COORDINATES AS WELL AS A CORRESPONDING APPARATUS

The present disclosure relates to a method of calibrating an apparatus for pointing spatial coordinates, wherein said apparatus comprises a moveable hand-held probe, having a pointing tip for pointing at said spatial coordinates, and a portable base unit, wherein said portable base unit is provided with sensors for measuring, in a predefined three dimensional, 3D, working area surrounding said portable base unit, a relative position of said pointed spatial coordinates with respect to said portable base unit.

An apparatus of the above mentioned type is known from EP patent 1,226,401, which can be used for measuring the shape or contour of two-dimensional or three-dimensional objects, such as small objects to be placed on a measuring table, or relatively large objects disposed in a room.

The known apparatus is equipped with a cord or a wire, for connecting the movable hand-held probe to the portable base unit via an elongated arm provided with the base unit. Therefore, only a single sensor suffices for determining the length or change in length of the cord or the wire.

A second sensor in the apparatus is used in order to enable accurate determination of the angle or angular displacement of the cord caused by a change in position of the hand-held probe. The second sensor is arranged to measure the rotational displacement of the arm in, for example two dimensions or three dimensions.

In an example, the sensors for measuring length or a change in length of the cord or the wire and rotation of the arm in at least one degree of freedom are understood to be sensors in the form of pulse generators, wherein the number of pulses delivered during use is proportional to a change in length or angular displacement of the cord or the wire or of the arm coupled thereto. Another option is to use potentiometers for measuring the rotation of the arm, and the change in length of the cord or the wire.

One of the challenges within this field is to increase the accuracy of the apparatus. That is, the accuracy with which the apparatus is able to pinpoint the actual spatial coordinated pointed by the hand-held probe.

SUMMARY

Consequently, it is an object of the present disclosure to provide for a method which improves the calibration process of the apparatus such that the actual measurements performed by the apparatus are improved.

It is another object to provide for an apparatus which is arranged to calibrate itself in a more accurate manner.

In order to accomplish that object, the present disclosure provides, in a first aspect thereof, for a method of calibrating an apparatus for pointing spatial coordinates, wherein said apparatus comprises a moveable hand-held probe, having a pointing tip for pointing at said spatial coordinates, and a portable base unit, wherein said portable base unit is provided with sensors for measuring, in a predefined three dimensional, 3D, working area surrounding said portable base unit, a relative position of said pointed spatial coordinates with respect to said portable base unit.

The method comprises the steps of:
determining an actual 3D working area for a particular measurement, wherein said actual 3D working area is a sub-area of said predefined 3D working area;
calibrating said apparatus in said actual 3D working area.

It was one of the insights of the inventors that it is beneficial in case the calibrating process is tuned to the actual 3D working area for a particular measurement. That is, it is not necessary to calibrate the apparatus for its whole 3D working area when the particular measurement is only performed in a portion of the whole 3D working area.

In accordance with the present disclosure, the 3D working area is defined as the working area in which the apparatus is able to operate. The apparatus is able to measure pointed spatial coordinates in that specific working area.

Typically, for a particular measurement, not the whole 3D working area is utilized but only a portion thereof. As such, the inventors found technical progress by calibrating the apparatus specifically for the actual 3D working area, i.e. the area in which the particular measurement is performed or to be performed.

The accuracy of the particular measurement is improved in case the calibration is performed in the actual 3D working area.

It is noted that the calibrating step may comprise the subsequent measurements of known reference points. These known measurement points may be known relative the apparatus itself, or relative to a further device, like a robot or the like. These reference points may be used by the apparatus to more accurately calibrate itself.

It is further noted that the apparatus may also be used to calibrate the further device, like the robot. In such a case, it may be beneficial if the apparatus and the further device are in communication with each other. The apparatus may calibrate itself, may determine the position, and orientation of itself as well as of the further device, and may communicate data related to the calibration process to the further apparatus. The further apparatus, for example the robot, may use this data to perform different kinds of steps like welding, pick and place actions, separating actions, etc.

The communication between the apparatus and the further device may be based on a Bluetooth connection, a wired connection, or anything alike. Alternatively, a user may input the data related to the calibration process manually in the further device.

In an example, the method comprises the initial steps of:
calibrating said apparatus in said predefined 3D working area;
performing a particular measurement by subsequently measuring a plurality of pointed spatial coordinates.

In this example, the steps are taken as follows. First, a calibration is performed in the predefined 3D working area. The calibration is thus tuned to the complete working area in which the apparatus is able to operate. Second, the particular measurement is performed. The particular measurement is performed in a subset of the complete 3D working area, i.e. in a reduced working area. Third, the actual 3D working area is determined by investigating the performed particular measurement. Finally, the apparatus is calibrated in said actual 3D working area for improving the accuracy of the apparatus in that particular actual 3D working area.

In a further example, the method comprises the step of:
correcting said measured plurality of pointed spatial coordinates based on said calibration of said apparatus in said actual 3D working area.

The advantage hereof is that there is no need to perform the actual measurement again. The measured plurality of pointed spatial coordinates is corrected based on the calibration of the apparatus in the actual 3D working area.

In another example, the step of determining said actual 3D working area comprises the step of:

receiving input from a user with respect to said particular measurement, wherein said input is a type of an object to be measured, or an application.

The input may, for example, be provided using an App on a smartphone or a tablet or the like. For example, the user may input the object to be measured like a kitchen, a door frame, a boat or anything alike, and the apparatus may determine the actual 3D working area based on this input.

The apparatus may be connected to the internet for receiving the input from the user. Alternatively, the smartphone or table or the like may have a direct connection to the apparatus, for example a Bluetooth connection or the like.

The app on the smartphone, tablet or the like may be directed to several applications. For example, a user may select, in the app, that he intends to measure a particular door frame. The user may then also be required to input several parameters relating to the position of the door frame, the position of the apparatus with respect to the door frame, or anything alike. All these parameters may be taken into account, by the apparatus, during the calibration process.

In a further example, the step of calibrating comprises:
performing measurements to reference points, wherein said reference points have spatial coordinates that are known for said portable base unit.

The apparatus may, for example, comprise a stand, a frame, extension arms, or anything like, wherein the stand, frame or extension arms are provided with the reference points. The reference points then extend to within the 3D working area of the apparatus. A user is then to point the reference points using the hand-held probe. The reference points have a known relative position to the base unit such that the apparatus can be calibrated.

In a further example, the portable base unit is provided with a rotatably supported elongated arm, wherein said hand-held probe connects to said portable base unit by means of a cord or a wire via said elongated arm, and wherein said base unit is provided with sensors for measuring length or a change in length of said cord or said wire and rotation of said arm.

In another example, the apparatus further comprises:
orientation means arranged for determining an orientation of said apparatus, and wherein
said calibrating unit is arranged for calibrating said apparatus in said actual 3D working area taking into account said determined orientation of said apparatus.

The orientation of the apparatus may be obtained using incline sensors, gyroscopes or anything alike. The orientation may be helpful to correctly determine the actual 3D working area.

In a second aspect, there is provided an apparatus for pointing spatial coordinates, wherein said apparatus comprises a moveable hand-held probe, having a pointing tip for pointing at said spatial coordinates, and a portable base unit, wherein said portable base unit is provided with sensors for measuring, in a predefined three dimensional, 3D, working area surrounding said portable base unit, a relative position of said pointed spatial coordinates with respect to said portable base unit.

The apparatus comprises:
a processor arranged for determining an actual 3D working area for a particular measurement, wherein said actual 3D working area is a sub-area of said predefined 3D working area;
a calibrating unit arranged for calibrating said apparatus in said actual 3D working area.

A hand-held probe according to the present invention is understood to be a device which is, in use, intended to be held by a human. For example, carried by a human when pointing spatial coordinates. The hand-held probe or device is compact enough and/of a weight such to be used or operated while being held in the hand or hands of a human.

The portable base unit is understood to mean the cabinet of the measuring apparatus having such dimensions and/or weight that a user can transport it easily, for example by one arm only. This unit is understood not to be a hand-held unit as, in use, the portable base unit is not supported by a human.

It is understood that during the multiple retrieved measuring signals, in accordance with the disclosure, the portable base unit is to be maintained stationary, i.e. placed on a single position, or can be placed elsewhere.

The spatial coordinates according to the present invention are understood to mean parameters defining the position in a space with respect to a reference point, i.e. the portable base unit, in a three dimensional coordinate system. These parameters may be distance, azimuth angle, and elevation angle of the corresponding relevant point with respect to the reference point.

In an example, the calibrating unit is further arranged for initially calibrating said apparatus in said predefined 3D working area, and wherein said processor is further arranged for performing a particular measurement by subsequently measuring a plurality of pointed spatial coordinates.

In a further example, the apparatus further comprises:
a correcting unit arranged for correcting said measured plurality of pointed spatial coordinates based on said calibration of said apparatus in said actual 3D working area.

In an example, the processor is further arranged for receiving input from a user with respect to said particular measurement, wherein said input is a type of an object to be measured, or an application.

In yet another example, the calibrating unit is further arranged for performing measurements to reference points, wherein said reference points have spatial coordinates that are known for said portable base unit.

In an example, the portable base unit is provided with a rotatably supported elongated arm, wherein said hand-held probe connects to said portable base unit by means of a cord or a wire via said elongated arm, and wherein said base unit is provided with sensors for measuring length or a change in length of said cord or said wire and rotation of said arm.

In a third aspect, there is provided a computer program product comprising a computer readable medium having instructions which, when executed by a processor of an apparatus, cause said apparatus to perform the method according to any of the examples as provided above.

The above-mentioned and other features and advantages of the invention will be best understood from the following description referring to an apparatus for pointing spatial coordinates and illustrated by the attached drawings. In the drawings, like reference numerals denote identical parts or parts performing an identical or comparable function or operation.

DETAILED DESCRIPTION

Figure 1:
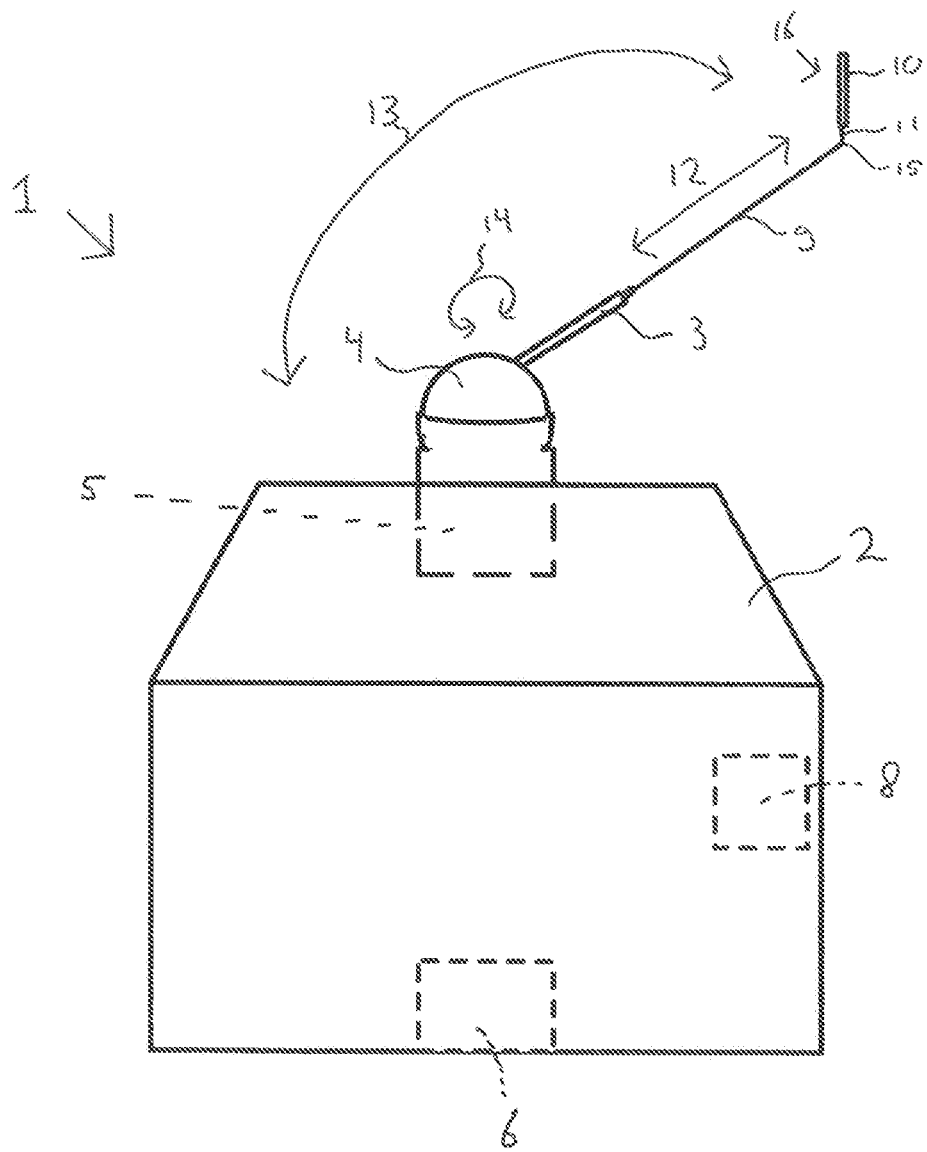
FIG. 1 is a schematic view of an apparatus for pointing target spatial coordinates according to the prior art.

FIG. 1 is a schematic view of an apparatus 1 for pointing target spatial coordinates 15 according to the prior art. The apparatus 1 comprises a portable base unit 2 and a movable hand-held probe 16, having a body 10 and a pointing element 11.

The base unit 2 further comprises a rotatably supported elongated arm 3 which is connected to the hand-held probe 16 by means of a wire or a cord 9. Sensors 5 for measuring length or a change of length 12 of the wire 9 and rotation of the arm 3 in two degrees of freedom are incorporated in the base unit 2.

The length or change in length of the wire or cord 9 is measured by means of the sensors 5 in the base unit 2, which sensors 5 measure the angular displacement of the reel, and another sensor may measure movement of the arm in an imaginary plane parallel to the upper surface of the base unit 2, which results in an accurate determination of the position of the attachment point 15 of the wire or cord 9 to the hand-held probe 16.

The rotatably supported elongated arm 3 is provided with a ball joint 4 at one end to rotatably fix the arm to the base unit 2. The rotatably supported elongated arm 3 is able to rotate in an imaginary plane parallel to the upper surface of the base unit 2, which plane is called the azimuth plane, as indicated by reference numeral 14. In addition thereto and as indicated by means of curved arrow 13, the rotatably supported elongated arm 3 may also rotate in an imaginary plane perpendicular to the upper surface of the base unit 2.

The base unit 2 further comprises computer-controlled processing means 6 for processing measuring signals delivered by the sensors 5. The measuring signals relate to the length 12 of the wire 9, and the angular direction of the rotatably supported elongated arm 3.

In the apparatus 1 according to the prior art, the target spatial coordinate equals the attachment point 15 of the wire at the hand-held probe 16. In this case, the attachment point 15 is thus at the end of the pointing element 11 of the hand-held probe 16.

As one can imagine, the apparatus 1 is to be calibrated to assure that the measured points correspond to the actual spatial coordinates. Typically, the apparatus is calibrated in its whole domain. That is, it is calibrated in its complete working area.

The inventors have found that such a calibration may be improved. The apparatus does not need to be calibrated in its whole working area whenever only a sub-area of that working area is used for a particular measurement. By limiting the calibration area, a more accurate calibration can be performed.

As such, the apparatus is arranged to determine an actual 3D working area for a particular measurement, wherein the actual 3D working area is a sub-area of the predefined 3D working area, and the apparatus is arranged to calibrate the apparatus in the actual 3D working area.

For example, a user may measure a particular object present in the predefined 3D working area. Once the user has finalized the measurement, the apparatus may determine the applicable actual 3D working area. The apparatus may, thus, determine the area that is actually covered by the user based on the measurement that is performed.

Once the actual 3D working area has been determined, the apparatus may recalibrate itself. That is, the apparatus may calibrate itself again, in a more accurate manner, in the actual 3D working area. Based on this accurate calibration, the point measured during the measurement may be updated, i.e. amended.

Figure 2:
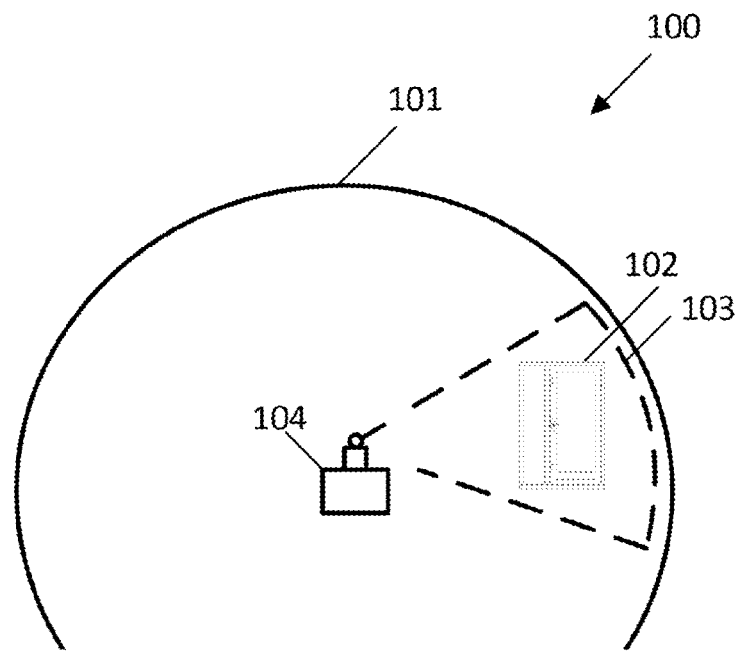
FIG. 2 is a schematic view of a 3D working area as well as an actual, i.e. reduced, 3D working area in which the calibration is to be performed.

FIG. 2 is a schematic view 101 of a predefined 3D working area 101 as well as an actual, i.e. reduced, 3D working area 103 in which the calibration is to be performed.

Here, the apparatus is indicated with reference numeral 104. The apparatus is able to measure spatial coordinates in the area as indicated with reference numeral 101. In the present scenario, a user is interested in measuring a particular object 102, wherein that particular object only covers a sub-set of the predefined 3D working area 101. The apparatus may determine the actual 3D working area 103 based on the measurement performed by the user on the object 102.

Figure 3:
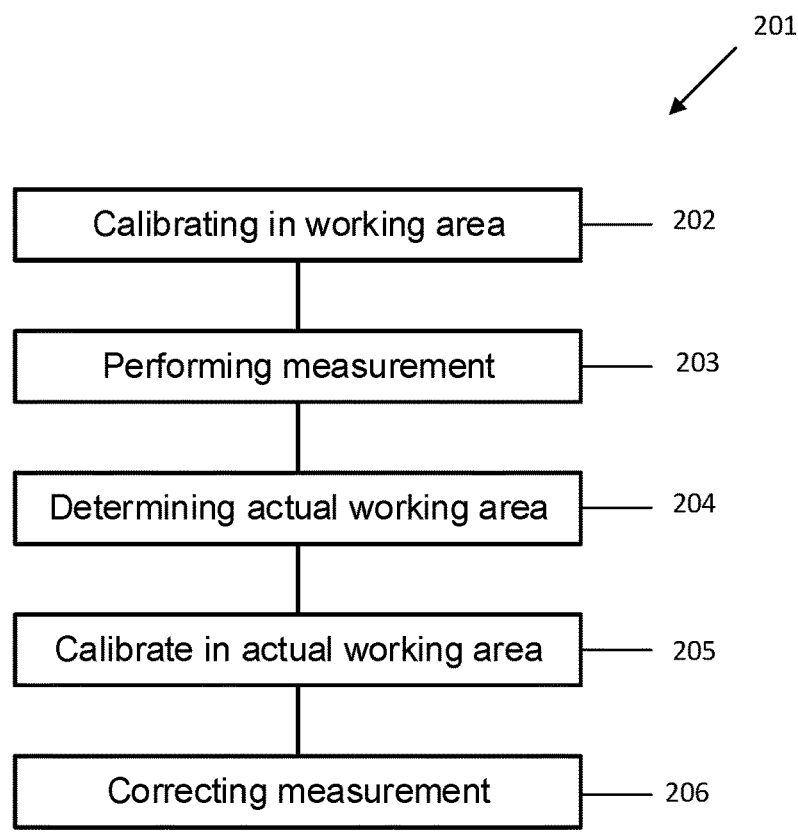
FIG. 3 shows an examples of a method in accordance with the present disclosure.

FIG. 3 shows an example of a method in accordance with the present disclosure.

The method 201 is directed to calibrating an apparatus for pointing spatial coordinates, wherein said apparatus comprises a moveable hand-held probe, having a pointing tip for pointing at said spatial coordinates, and a portable base unit, wherein said portable base unit is provided with sensors for measuring, in a predefined three dimensional, 3D, working area surrounding said portable base unit, a relative position of said pointed spatial coordinates with respect to said portable base unit.

The method 201 comprises the steps of:
calibrating 202 the apparatus in the predefined 3D working area;
performing 203 the measurement on an object present in the 3D working area;
determining 204 an actual 3D working area for a particular measurement, wherein said actual 3D working area is a sub-area of said predefined 3D working area;
(re)-calibrating said apparatus in said determined actual 3D working area, and
correcting 206 the measurement performed based on the recalibration.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A method of calibrating an apparatus for pointing spatial coordinates, wherein said apparatus comprises a moveable hand-held probe, having a pointing tip for pointing at said spatial coordinates, and a portable base unit, wherein said portable base unit is provided with sensors for measuring, in a predefined three dimensional, 3D, working area surrounding said portable base unit, a relative position of said pointed spatial coordinates with respect to said portable base unit, wherein said method comprises the steps of:
- determining an actual 3D working area for a particular measurement, wherein said actual 3D working area is a sub-area of said predefined 3D working area;
- calibrating said apparatus in said actual 3D working area.

2. The method in accordance with claim 1, wherein said method further comprises:
- calibrating said apparatus in said predefined 3D working area;
- performing a particular measurement by subsequently measuring a plurality of pointed spatial coordinates.

3. The method in accordance with claim 2, wherein said method further comprises the step of:
- correcting said measured plurality of pointed spatial coordinates based on said calibration of said apparatus in said actual 3D working area.

4. The method in accordance with claim 1, wherein said step of determining said actual 3D working area comprises the step of:
- receiving input from a user with respect to said particular measurement, wherein said input is a type of an object to be measured, or an application.

5. The method in accordance with claim 1, wherein said step of calibrating comprises:
- performing measurements to reference points, wherein said reference points have spatial coordinates that are known for said portable base unit.

6. The method in accordance with claim 1, wherein said portable base unit is provided with a rotatably supported elongated arm, wherein said hand-held probe connects to said portable base unit by means of a cord or a wire via said elongated arm, and wherein said base unit is provided with sensors for measuring length or a change in length of said cord or said wire and rotation of said arm.

7. An apparatus for pointing spatial coordinates, wherein said apparatus comprises a moveable hand-held probe, having a pointing tip for pointing at said spatial coordinates, and a portable base unit, wherein said portable base unit is provided with sensors for measuring, in a predefined three dimensional, 3D, working area surrounding said portable base unit, a relative position of said pointed spatial coordinates with respect to said portable base unit, wherein said apparatus comprises:
- a processor arranged for determining an actual 3D working area for a particular measurement, wherein said actual 3D working area is a sub-area of said predefined 3D working area;
- a calibrating unit arranged for calibrating said apparatus in said actual 3D working area.

8. The apparatus in accordance with claim 7, wherein said calibrating unit is further arranged for initially calibrating said apparatus in said predefined 3D working area, and wherein said processor is further arranged for performing a particular measurement by subsequently measuring a plurality of pointed spatial coordinates.

9. The apparatus in accordance with claim 8, wherein said apparatus further comprises:
- a correcting unit arranged for correcting said measured plurality of pointed spatial coordinates based on said calibration of said apparatus in said actual 3D working area.

10. The apparatus in accordance with claim 7, wherein said processor is further arranged for receiving input from a user with respect to said particular measurement, wherein said input is a type of an object to be measured, or an application.

11. The apparatus in accordance with claim 7, wherein said calibrating unit is further arranged for performing measurements to reference points, wherein said reference points have spatial coordinates that are known for said portable base unit.

12. The apparatus in accordance with claim 7, wherein said portable base unit is provided with a rotatably supported elongated arm, wherein said hand-held probe connects to said portable base unit by means of a cord or a wire via said elongated arm, and wherein said base unit is provided with sensors for measuring length or a change in length of said cord or said wire and rotation of said arm.

13. The apparatus in accordance with claim 7, wherein said apparatus further comprises:
- orientation means arranged for determining an orientation of said apparatus, and wherein said calibrating unit is arranged for calibrating said apparatus in said actual 3D working area taking into account said determined orientation of said apparatus.

14. A computer program product comprising a non-transitory computer readable medium having instructions executable by a processor of an apparatus, said apparatus comprises a moveable hand-held probe, having a pointing tip for pointing at said spatial coordinates, and a portable base unit, wherein said portable base unit is provided with sensors for measuring, in a predefined three dimensional, 3D, working area surrounding said portable base unit, a relative position of said pointed spatial coordinates with respect to said portable base unit, the instructions which, when executed by the processor of the apparatus, cause said apparatus to:
- determining an actual 3D working area for a particular measurement, wherein said actual 3D working area is a sub-area of said predefined 3D working area;
- calibrating said apparatus in said actual 3D working area.

* * * * *